(12) United States Patent
Park et al.

(10) Patent No.: US 11,962,208 B2
(45) Date of Patent: Apr. 16, 2024

(54) AIR GAP ADJUSTMENT APPARATUS

(71) Applicant: HYOSUNG HEAVY INDUSTRIES CORPORATION, Seoul (KR)

(72) Inventors: Chul Jun Park, Busan (KR); Sang Deok Kim, Gimhae-si (KR); Seung Ki Kim, Gwangmyeong-si (KR); Yoon Zong Kim, Busan (KR); Kyo Ho Lee, Seoul (KR); Kwang Jin Kim, Gimhae-si (KR); Joo Seob Kim, Changwon-si (KR); Bit Na Oh, Changwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 17/623,435

(22) PCT Filed: Jan. 28, 2021

(86) PCT No.: PCT/KR2021/001168
§ 371 (c)(1),
(2) Date: Dec. 28, 2021

(87) PCT Pub. No.: WO2021/162297
PCT Pub. Date: Aug. 19, 2021

(65) Prior Publication Data
US 2022/0352798 A1    Nov. 3, 2022

(30) Foreign Application Priority Data
Feb. 11, 2020   (KR) .................... 10-2020-0016390

(51) Int. Cl.
*H02K 5/16* (2006.01)
*H02K 7/08* (2006.01)
(Continued)

(52) U.S. Cl.
CPC ............. *H02K 15/16* (2013.01); *H02K 7/085* (2013.01); *H02K 15/0006* (2013.01); *H02K 2201/03* (2013.01)

(58) Field of Classification Search
CPC ............ H02K 5/00; H02K 5/16; H02K 5/161; H02K 5/17; H02K 5/173; H02K 5/1732;
(Continued)

(56) References Cited

U.S. PATENT DOCUMENTS 6,724,112 B2 * 4/2004 Chihara ................ F16C 35/067
310/90
2007/0096584 A1 * 5/2007 Erfanfar ................... H02K 1/30
310/216.049

FOREIGN PATENT DOCUMENTS

JP    05-060156 U    8/1993
JP    2000-166165 A   6/2000
(Continued)

*Primary Examiner* — Tran N Nguyen
(74) *Attorney, Agent, or Firm* — NKL LAW; Jae Youn Kim

(57) ABSTRACT

Proposed is an air gap adjustment apparatus. The apparatus is for enabling an air gap between the inner surface of a stator and the outer surface of a rotor, which are installed in an inner space of a housing, to be uniform overall. A plurality of fastening holes are formed so as to surround a shaft through hole of an end plate constituting the housing. A fastener, which has passed through a bearing housing of a bearing, is fastened to each fastening hole so as to mount the bearing to the end plate. An adjusting member body of an adjusting member, which has passed through the bearing housing, is positioned in an adjusting member seating part which is formed at the entrance of each fastening hole. The adjusting member rotates about the adjusting member body so that a head part may adjust the position of the bearing.

8 Claims, 7 Drawing Sheets

(51) Int. Cl.
*H02K 15/00* (2006.01)
*H02K 15/16* (2006.01)

(58) Field of Classification Search
CPC .. H02K 5/24; H02K 7/00; H02K 7/08; H02K 7/085; H02K 15/00; H02K 15/16; B23Q 1/70; B23Q 16/00; B23Q 3/00; B23Q 3/12; B23Q 3/15; B23Q 3/155; F16C 35/00; F16C 35/04; F16C 35/06; F16C 35/067
See application file for complete search history.

(56) References Cited

FOREIGN PATENT DOCUMENTS

| | | | |
|---|---|---|---|
| JP | 2019-110737 A | | 7/2019 |
| KR | 10-0764944 B1 | | 10/2007 |
| KR | 100764944 B1 | * | 10/2007 |

* cited by examiner

AIR GAP ADJUSTMENT APPARATUS

TECHNICAL FIELD

The present disclosure relates to an air gap adjustment apparatus and, more particularly, to an air gap adjustment apparatus that can adjust the air gap with a rotor installed inside a housing.

BACKGROUND ART

In the case of an electric motor, a stator is fixed and installed inside a housing, and a rotor is installed inside the stator while rotatably supported by the housing. A predetermined air gap must be accurately set between the inner surface of the stator and the outer surface of the rotor.

When the air gap between the stator and the rotor is relatively small, the noise and vibration of the motor increase, whereas when the air gap is relatively large, the noise and vibration of the motor decrease. Furthermore, it is important that the air gap between the stator and the rotor is to be uniform overall, but in general motors, there is no way to adjust the air gap in the assembled state.

Generally, the stator is installed to be fixed to the inner surface of the housing, and the rotor is installed through the center of the stator, with a rotating shaft protruding back and forth therefrom is rotatably supported by a bearing at the front and rear ends of the housing. Here, the relative position of the rotor with respect to the stator cannot be changed since the bearing is fixedly installed at the front and rear ends of the housing.

DISCLOSURE

Technical Problem

Accordingly, the present disclosure is proposed to solve the above-described problems and an objective of the present disclosure is to provide an air gap adjustment apparatus that can adjust the relative position between the stator and the rotor so that the air gap between the stator and the rotor is adjusted.

Technical Solution

According to an embodiment of the present disclosure for achieving the objective as described above, provided is an air gap adjustment apparatus, including: a housing in which a stator is installed, and a rotor is rotatably installed with a predetermined air gap inside the stator; a bearing installed at an end plate of the housing to rotatably support a rotating shaft that rotates integrally with the rotor; an adjusting member of which an adjusting member body is installed partially in the end plate of the housing, and adjusting an installation position of the bearing according to a degree to which a head part of the adjusting member is positioned and rotated in a bearing housing of the bearing; and a fastener for fastening the bearing to the housing by being fastened to the housing through a fastener-through hole formed through the adjusting member.

The adjusting member body is located in an adjusting member seating part formed on an end plate that is provided at each end of the housing and on which the bearing is mounted.

The adjusting member seating part is formed at an entrance of a fastening hole to which the fastener for fastening the bearing to the end plate is fastened.

In the bearing housing, a through hole in which the adjusting member body of the adjusting member is positioned at a position corresponding to the fastening hole, and a head seating part in which the head part of the adjusting member is seated are formed.

An inner shape of the adjusting member seating part has a shape corresponding to an outer shape of the adjusting member body.

The fastening hole is formed at each of a position of the end plate corresponding to each end of the rotating shaft in a width direction and a position of the end plate corresponding to an upper portion of a center of the cross-section of the rotating shaft.

The adjusting member body is formed at an eccentric position from a geometric center of the head part.

The adjusting member body has a cylindrical or polygonal prism shape.

Advantageous Effects

The following effects can be obtained from the air gap adjustment apparatus according to the present disclosure.

In the air gap adjustment apparatus according to the present disclosure, the air gap between the stator and the rotor is adjusted by adjusting the position of the rotor relative to the stator fixed inside the housing. To this end, a bearing installed on an end plate of the housing with respect to the stator fixed to the housing and rotatably supporting a rotating shaft of the rotor is movable with respect to the end plate. Therefore, according to the present disclosure, the air gap between the stator and the rotor can be adjusted by varying the position of the rotor relative to the stator, and the air gap between the stator and the rotor can be adjusted more homogeneously. Thereby, it is possible to minimize the generation of vibration and noise of the motor.

In the air gap adjustment apparatus according to the present disclosure, when adjusting the installation position of the bearing with respect to the end plate of the housing end, the air gap between the stator and the rotor is adjusted by placing an adjusting member through which a fastener passes at the position of the fastener for fastening the bearing to the end plate, and setting the rotational position of the adjusting member. In other words, since the adjusting member is operated in a state where the bearing is temporarily assembled to the end plate using the fastener, the air gap can be set relatively simply.

MODE FOR INVENTION

Figure 1:
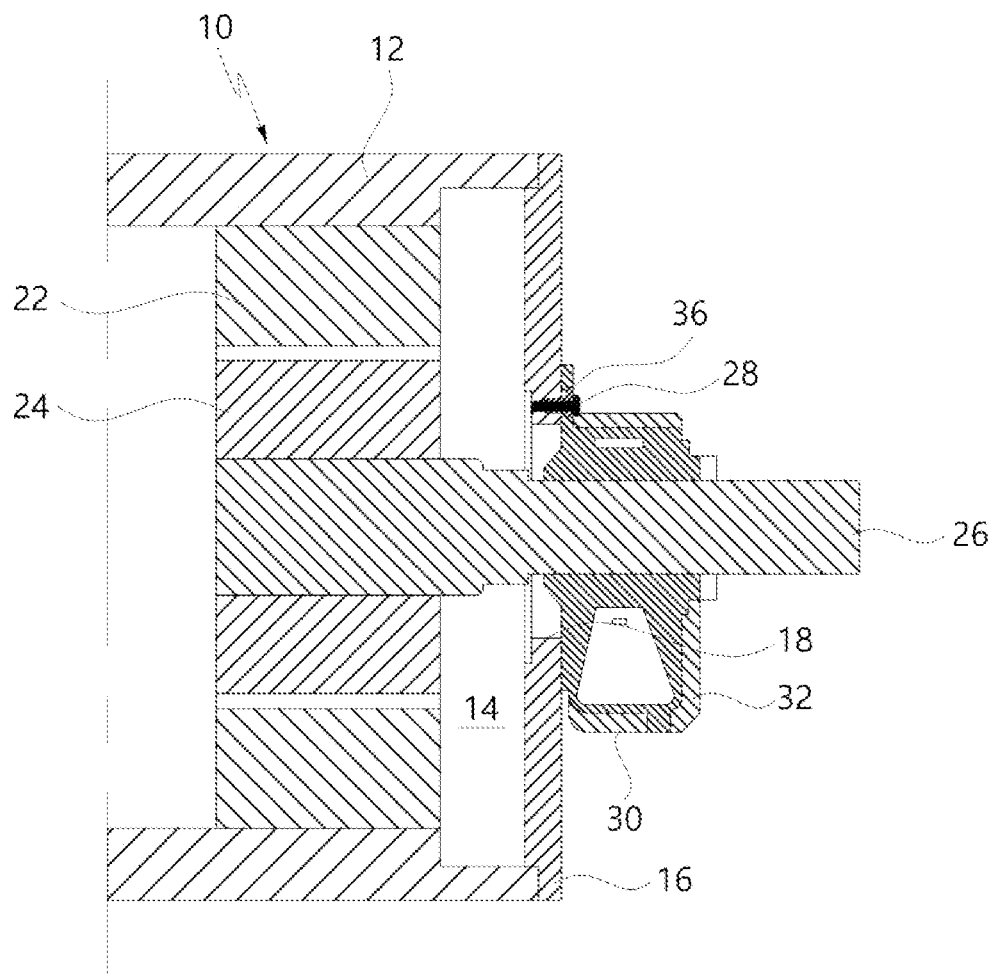
FIG. 1 is a schematic cross-sectional view showing the configuration of an electric motor employing a preferred embodiment of an air gap adjustment apparatus according to the present disclosure.

Hereinafter, some embodiments of the present disclosure will be described in detail with reference to the accompanying exemplary drawings. It should be noted that in assigning reference numerals to the components of each drawing the same components, even if they are indicated on different drawings, are to have the same reference numerals as much as possible. Also, in describing an embodiment of the present disclosure, when it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only used to distinguish the component from other components, and the essence or order of the component is not limited by the term. It should be understood that when a component is described as being "connected", "coupled", or "linked" to another component, that component may be directly connected to or linked to that other component, but yet another component may be "connected", "coupled", or "linked" between each component.

According to the drawings, as for a housing 10, a cylindrical housing main body 12 constitutes an exterior, and an inner space 14 is formed inside the housing body main 12. The inner space 14 is opened front and back when looking at only the housing main body 12. As for the housing main body 12, at least the inner space 14 may have a cylindrical shape. The outer surface of the housing main body 12 may be made in various shapes that are not necessarily cylindrical.

An end plate 16 is provided at the end of the housing main body 12 to shield the inner space 14 of the housing main body 12 from the outside. The end plate 16 constitutes the housing 10 together with the housing main body 12. The end plate 16 is equipped with a bearing 30, which will be described below. The end plate 16 is installed at each end of the housing main body 12. A shaft through hole 18 is formed through the center of the end plate 16. A rotating shaft 26 to be described below passes through the shaft through hole 18 so that the rotation shaft 26 protrudes from the inner space 14 to the outside.

Figure 5:
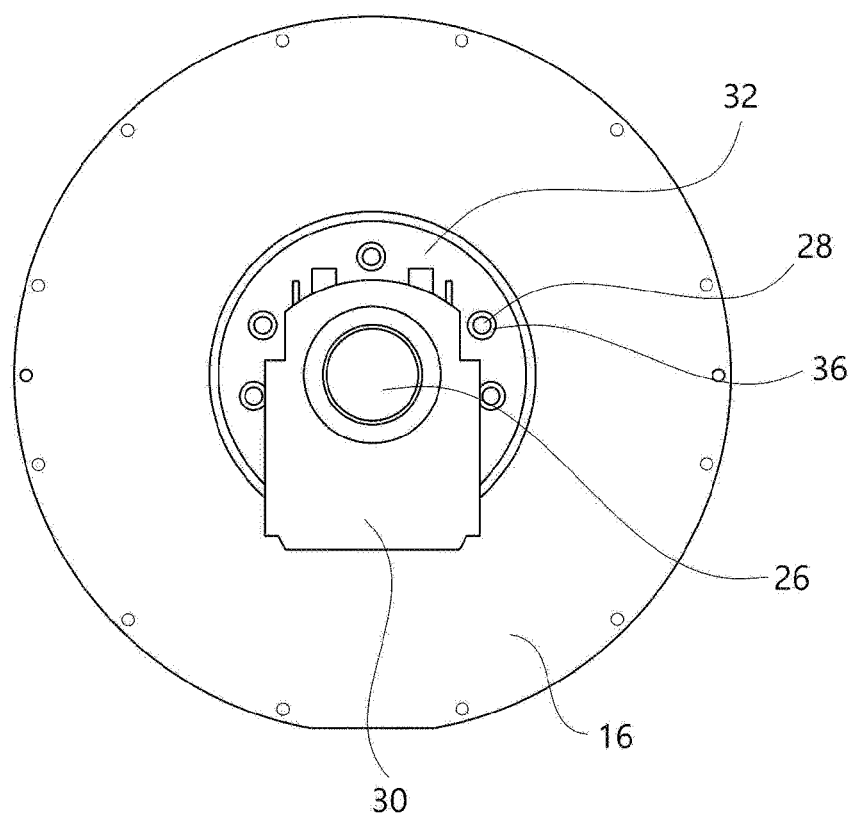
FIG. 5 is a front view of the configuration using a basic adjusting member in the embodiment of the present disclosure viewed from one end of the rotation shaft.

The end plate 16 has a plurality of fastening holes 19 around the shaft through hole 18. The fastening holes 19 are a part to which the fastener 28 for mounting the bearing 30 to be described below to the end plate 16 is fastened. In the embodiment, five fastening holes 19 are formed. As shown in FIG. 5, two of the fastening holes 19 are respectively arranged in the vertical direction on each side of the rotating shaft 26 in the width direction, and one is above the vertical center line of the rotating shaft 26. It is possible that only one fastening hole 19 is formed on each side of the rotating shaft 26 in the width direction.

Figure 2:
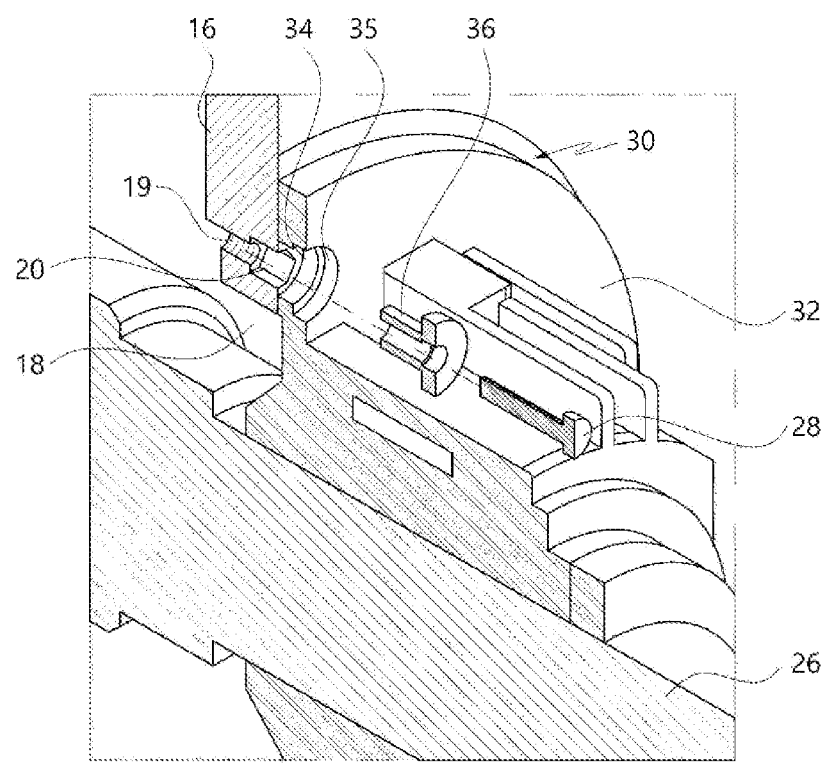
FIG. 2 is a partial cross-sectional exploded perspective view showing the configuration of the embodiment of the present disclosure.
Figure 3:
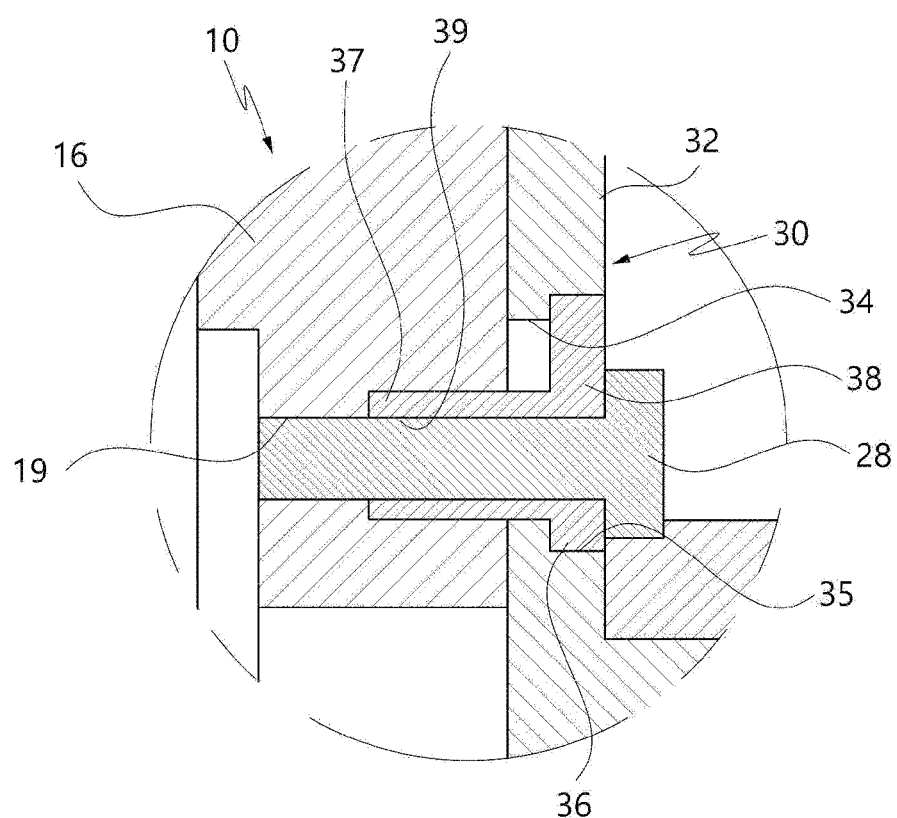
FIG. 3 is a cross-sectional view showing the configuration of an important part of the embodiment of the present disclosure.
Figure 4:
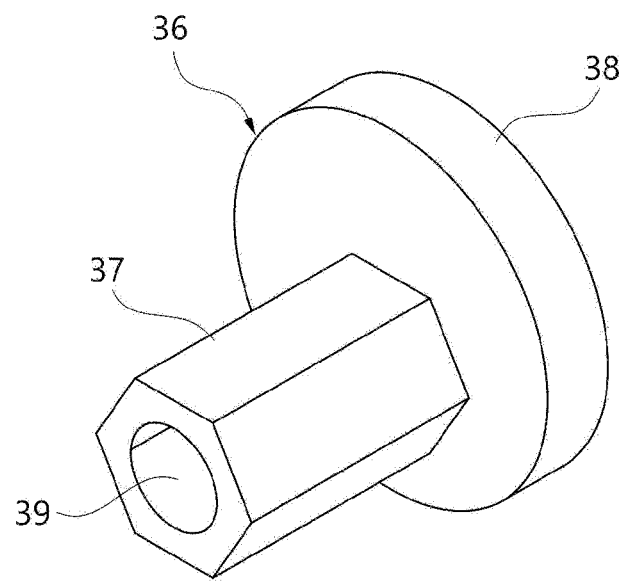
FIG. 4 is a perspective view showing the configuration of an adjusting member constituting the embodiment of the present disclosure.

An adjusting member seating part 20 is formed at the entrance of the fastening hole 19. At least part of the adjusting member body 37 of the adjusting member 36 to be described below is located in the adjusting member seating part 20. The inner diameter of the adjusting member seating part 20 is larger than that of the fastening hole 19. As can be seen in FIG. 2, the adjusting member seating part 20 has a shape corresponding to the outer surface shape of the adjusting member 36 to be described below. In the embodiment, the fastening hole 19 is formed in the shape of a hexagonal prism. Since the shape of the fastening hole 19 corresponds to the shape of the adjusting member body 37 of the adjusting member 36 to be described below, when the adjusting member body 37 has a cylindrical prism shape, the inner surface of the fastening hole 19 should also have a cylindrical prism shape.

A stator 22 is installed around the inner surface of the housing main body 12. The stator 22 is roughly cylindrical in shape, and the outer surface of the stator 22 is mounted on the inner surface of the housing main body 12. A rotor 24 is installed inside the stator 22. The rotor 24 also is roughly cylindrical in shape, and the rotating shaft 26 is installed through the inside of the rotor. The rotor 24 rotates by electromagnetic interaction with the stator 22. The rotation of the rotor 24 is transmitted to the outside through the rotating shaft 26.

A bearing 30 is mounted on the end plate 16 by fasteners 28. The fasteners 28 pass through a bearing housing 32 of the bearing 30 and are fastened to the fastening holes 19 of the end plate 16. The bearing 30 rotatably supports the rotating shaft 26. The bearing housing 32 forms the frame of the bearing 30. Through holes 34 are formed in the bearing housing 32 at a position corresponding to the fastening holes 19. The fasteners 28 pass through the through holes 34. At the entrance of the through hole 34, there is a head seating groove 35. A head part 38 of the adjusting member 36 to be described below is located in the head seating groove 35.

The adjusting member 36 is positioned simultaneously in the through hole 34 of the bearing housing 32 and the adjusting member seating part 20 of the end plate 16. The adjusting member 36 has the head part 38 formed at the distal end of the adjusting member body 37 in the shape of a polygonal tubular shape. The outer diameter of the head part 38 is formed to be larger than that of the adjusting member body 37. The head part 38 is disc-shaped, in which the adjusting member body 37 is located eccentrically from the geometric center of the head part 38. Because the adjusting member body 37 is eccentric with respect to the head part 38 as such, the adjusting member 36 is rotated and thereby the position of the bearing housing 32 can be moved.

Meanwhile, there may be a case where the adjusting member body 37 is not in an eccentric position with respect to the head part 38 in the adjusting member 36. This is referred to as a basic adjusting member, and the one described above and shown in the drawings is called an eccentric adjusting member 36. Of course, it is not possible to adjust the air gap only with the basic adjusting member. In using the basic adjusting member, if the result of checking the air gap suggests an adjustment is necessary, the air gap is adjusted using the eccentric adjusting member 36.

The outer surface of the adjusting member body 37 has a different degree of eccentricity, according to its position, from the geometric center of the head part 38. This is why the head part 38 can adjust the position of the bearing housing 32 by rotating the adjusting member 36.

The adjusting member body 37 has a polygonal prism shape. In the embodiment, the adjusting member body 37 is in a hexagonal prism shape, but may be in a polygonal prism shape such as triangular, quadrangular, pentagonal, hexagonal, or septagonal. Because the adjusting member body 37 has a polygonal prism shape, the adjustment of the position of the bearing housing 32 is not continuous and may be performed only in a few steps. Of course, the adjusting member body 37 may have a cylindrical prism shape. When the adjusting member body 37 is in a cylindrical prism shape, position adjustment of the bearing housing 32 may be made continuously.

A fastener through hole 39 is formed by passing through the adjusting member 36. The fastener through hole 39 is a part through which the fastener 28 passes, and is formed through the adjusting member body 37 and the head part 38 of the adjusting member 36. The fastener through hole 39 is the center of rotation of the adjusting member 36.

Hereinafter, it will be described in detail that the air gap adjustment apparatus according to the present disclosure having the configuration as described above is used.

Figure 6:
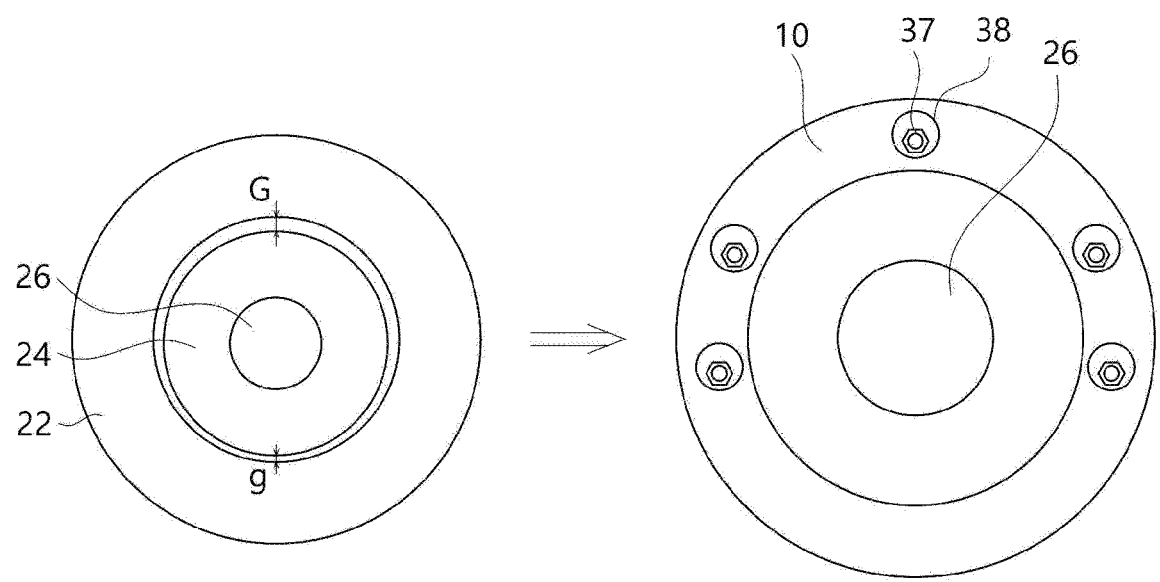
FIG. 6 is a use state diagram showing a state in which a rotor is lowered to the relatively lower side based on the drawing in the embodiment of the present disclosure, and an adjustment state in which this problem has been resolved.
Figure 7:
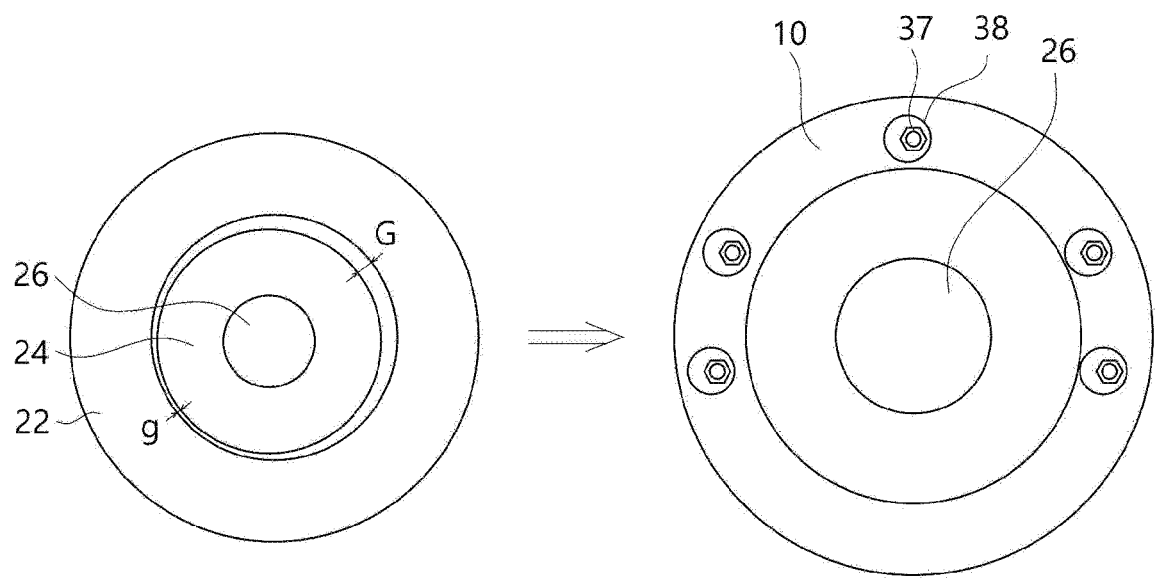
FIG. 7 is a use state diagram showing a state in which a rotor is lowered to the relatively lower left side based on the drawing in the embodiment of the present disclosure, and an adjustment state in which this problem has been resolved.

The air gap adjustment apparatus according to the present disclosure may have the air gap between the inner surface of the stator 22 and the outer surface of the rotor 24 that is not uniform overall, and there may be a part where the air gap has the largest value G and a part where the air gap has the smallest value g. FIG. 6 shows a state in which the air gap is not uniform as the rotor 24 moves relatively downward based on the drawing. FIG. 7 shows a state in which the air gap is not uniform overall as the rotor 24 moves to the lower left based on the drawing.

In these cases, the distance with the stator 22 is made uniform overall by moving the position of the rotor 24. To this end, the bearing 30 rotatably supporting the rotating shaft 26 which is integrally rotated with the rotor 24 is moved.

The movement of the bearing 30 is performed by rotating the adjusting member 36 at a certain angle while the fasteners 28 are not completely removed but loosened only to a certain extent. In the adjusting member 36, the adjusting member body 37 is located in the adjusting member seating part 20 of the end plate 16 and in the through hole 34 of the bearing housing 32, so when the adjusting member 36 is rotated, the adjusting member body 37 is rotated within the adjusting member seating part 20 and the through hole 34 so that the head part 38 moves the bearing housing 32. This is because the adjusting member body 37 is eccentric with respect to the head part 38, as the adjusting member body 37 is rotates, the head part 38 rotates eccentrically to move the bearing housing 32.

As shown in FIG. 6, when the rotor 24 is in a state in which it is moved relatively downward with respect to the stator 22, the rotor 24 should be moved upward overall based on the drawing by adjusting the adjusting member 36. To this end, the position of the head part 38 should be rotated so that the more protruding part goes to the upper part based on the rotation center of the adjusting member 36. This can be clearly seen in the drawing on the right in FIG. 6.

As shown in the drawing on the left in FIG. 7, when the rotor 24 is in a state in which it is moved to the lower left with respect to the stator 22, the rotor 24 should be moved to upper right side. To this end, the rotor 24 should be moved to the right and upwards by rotating the five adjusting members 36. The state adjusted in this way is shown in the drawing on the right in FIG. 7.

When adjusting the adjusting member 36 in the present disclosure, part of the fastener 28 should first be loosened to make the adjusting member 36 freely rotatable. For reference, in the initial state, there may be a basic adjusting member other than the eccentric adjusting member 36 installed. In this case, when the air gap non-uniformity occurs between the stator 22 and the rotor 24 due to eccentricity, remove the basic adjusting member and install the eccentric adjusting member 36 instead to solve the problem of non-uniformity of the air gap.

In other words, in a state in which the eccentric adjusting member 36 is installed and in which the fastener 28 is partially loosened, the overall air gap should be looked at while rotating the eccentric adjusting member 36. When the overall air gap is uniformly set by rotating the eccentric adjusting member 36, by fastening the fasteners 28, the eccentric adjusting member 36 is fixed and the bearing 30 is firmly fastened to the end plate 16.

In the above, even though it has been described that all components constituting the embodiment of the present disclosure operate by being combined or combined into one, the present disclosure is not necessarily limited to this embodiment. That is, within the scope of the object of the present disclosure, all of the components may operate by selectively combining one or more. In addition, since terms such as "include", "comprise", or "have" described above mean that the corresponding component may be inherent unless otherwise defined, it should not be construed as excluding other components, but may further include other components. All terms used herein, including technical or scientific terms, have the same meaning as commonly understood by a person skilled in the art. Terms such as those defined in the commonly used dictionaries should be construed as having meanings consistent with the meanings in the context of the related art and shall not be construed in ideal or excessively formal meanings unless expressly defined in the present disclosure.

The above description is merely illustrative of the technical idea of the present disclosure, and a person skilled in the art to which the present disclosure pertains may implement various modifications and variations without departing from the gist of the present disclosure. Accordingly, the embodiment disclosed in the present disclosure is not intended to limit, but to illustrate the technical spirit of the present disclosure, thus the scope of the technical idea of the present disclosure is not limited by the embodiment. The protection scope of the present disclosure should be interpreted by the appended claims and all technical ideas within the scope equivalent thereto should be construed as being included in the scope of the present disclosure.

In the illustrated embodiment, the present disclosure is applied to an electric motor, but it can be applied to various devices in which an air gap is formed between the rotor and the stator.

The invention claimed is:

1. An air gap adjustment apparatus, comprising:
   a stator housing;
   a stator installed in the stator housing;
   a rotor rotatably installed with a predetermined air gap inside the stator;
   a bearing installed at an end plate of the stator housing to rotatably support a rotating shaft that rotates integrally with the rotor;
   an adjusting member including an adjusting member body installed partially into the end plate of the stator housing, and a head part of the adjusting member located in a bearing housing of the bearing, wherein the adjusting member adjusts an installation position of the bearing according to a relative rotation angle of the head part with respect to the bearing housing and adjusts the installation position of the bearing according to an angle at which the head part of the adjusting member is positioned and rotated in the bearing housing of the bearing; and a fastener to fasten the bearing to the end plate of the stator housing, wherein the fastener being inserted from the bearing housing through a fastener-through hole formed through the adjusting member partially into the end plate of the stator housing.

2. The air gap adjustment apparatus of claim 1, wherein the adjusting member body is located in an adjusting member seating part formed on the end plate.

3. The air gap adjustment apparatus of claim 2, wherein the adjusting member seating part is formed at an entrance of a fastening hole, and wherein the fastener for fastening the bearing to the end plate is fastened to the fastening hole of the end plate.

4. The air gap adjustment apparatus of claim 3, wherein in the bearing housing, a through hole in which the adjusting member body of the adjusting member is positioned, and a head seating part in which the head part of the adjusting member is seated are respectively formed, and wherein the through hole and the head seating part are formed at position corresponding to the fastening hole, respectively.

5. The air gap adjustment apparatus of claim 4, wherein an inner shape of the adjusting member seating part has a shape corresponding to an outer shape of the adjusting member body.

6. The air gap adjustment apparatus of claim 4, wherein the fastening hole is formed at each of a position of the end plate corresponding to each end of the rotating shaft in a width direction and a position of the end plate corresponding to an upper portion of a center of the cross-section of the rotating shaft.

7. The air gap adjustment apparatus of claim 1, wherein the adjusting member body is formed at an eccentric position from a geometric center of the head part.

8. The air gap adjustment apparatus of claim 7, wherein the adjusting member body has a cylindrical or polygonal prism shape.

* * * * *